United States Patent [19]
Liff

[11] Patent Number: 4,920,580
[45] Date of Patent: May 1, 1990

[54] FACE MASK AND BODY PROSTHESIS

[76] Inventor: Lawrence J. Liff, 6502 N. Central, Phoenix, Ariz. 85012

[21] Appl. No.: 409,304

[22] Filed: Sep. 19, 1989

[51] Int. Cl.⁵ ............................................. A41G 7/00
[52] U.S. Cl. ......................................... 2/206; 623/66; 446/27
[58] Field of Search ....................... 2/206, 171, 174, 9, 2/243 R, 243 B, 1; 623/66, 10, 901; 264/222, 554, 549, 319, 322, 521, 522; 132/286; 446/27; 428/187, 542.6

[56] References Cited
U.S. PATENT DOCUMENTS

| 626,799 | 6/1899 | Walton | 2/206 |
|---|---|---|---|
| 1,761,664 | 6/1930 | Harris | 2/206 |
| 2,023,214 | 12/1935 | Westmore | 2/206 |
| 2,124,767 | 7/1938 | Dawn | 2/206 |
| 2,262,993 | 11/1941 | Dessart | 2/206 |
| 2,616,091 | 11/1952 | Luttge | 2/192 X |
| 3,673,611 | 7/1972 | Cain | 2/192 |
| 4,121,304 | 10/1978 | Cooper | 2/206 |
| 4,127,631 | 11/1978 | Dempsey | 264/554 X |
| 4,134,153 | 1/1979 | Voorhees | 2/174 |
| 4,397,701 | 8/1983 | Johnson et al. | 264/222 X |
| 4,594,276 | 6/1986 | Relyea | 446/27 X |
| 4,644,591 | 2/1987 | Goldberg | 446/27 X |
| 4,783,350 | 11/1988 | DeMatteo et al. | 446/27 X |
| 4,864,663 | 9/1989 | Horan | 2/206 |

FOREIGN PATENT DOCUMENTS 2258136  8/1975  France ................................. 2/192

Primary Examiner—Peter Nerbun
Attorney, Agent, or Firm—Woodling, Krost & Rust

[57] ABSTRACT

A facial and/or body prosthesis or appliance is disclosed. The material formed into the final prosthesis is a specific material uniquely adapted for the purpose. The material is a closed-cell, cross-linked, polyethylene and is in sheet form having a thickness in the range of from 1/64 inch to ¼ inch and a density of between 1½ and 9 pounds per cubic foot.

2 Claims, 11 Drawing Sheets

FIG. 8
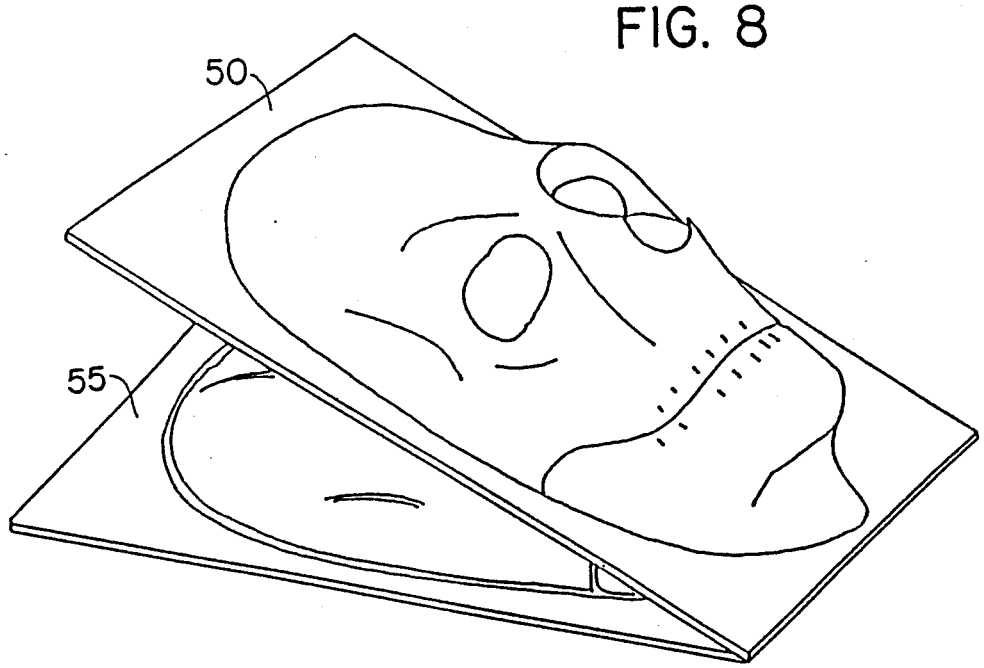
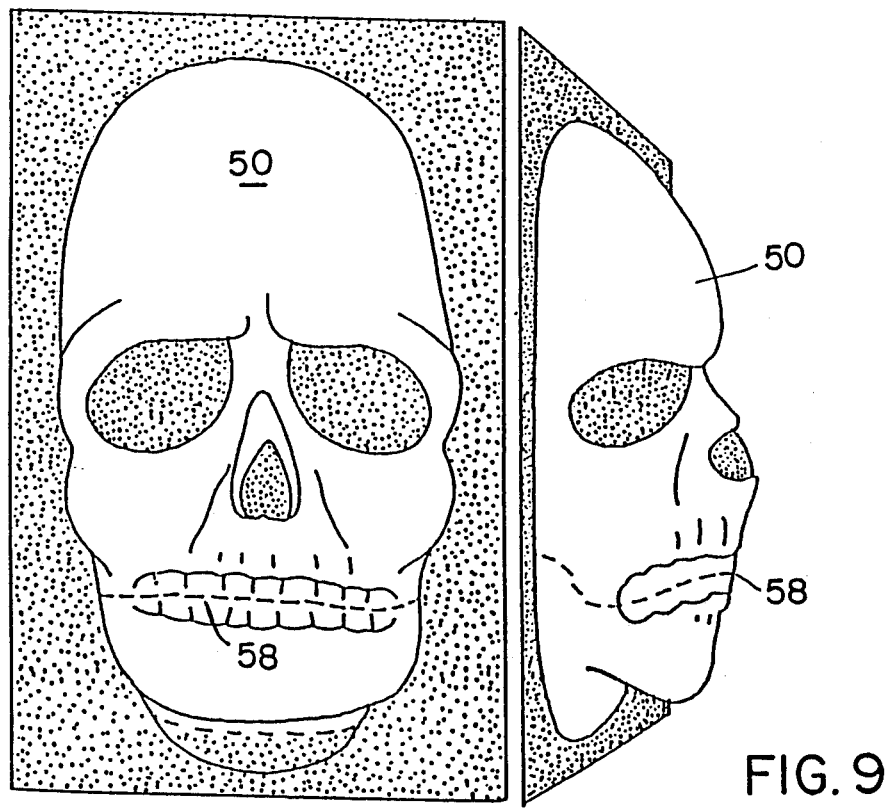
FIG. 9

FACE MASK AND BODY PROSTHESIS

This is a divisional of co-pending application Ser. No. 405,286, filed on Aug. 4, 1982 which is a C-I-P of Ser. No. 143,861, filed Apr. 25, 1980, "Facial Prosthesis" now abandoned.

The present invention addresses itself to the creation of and resultant product If a facial appliance which will accommodate on the order of 80% of the presently existing population with a facial makeup. It also contemplates a prosthesis for use on other parts of the body.

This makes the invention readily available to mass merchandising so that it is within the average person's grasp to create a very dynamic makeup out of safe materials.

The facial appliance process of applying a prefabricated part to a person's face to alter the look or change the expression has been around for a long time. It has traditionally been a very long and time consuming process as well as a process requiring a great deal of skill. Usually the makeup artist involved must be skillful enough to actually sculpt the original part himself. He must be able to sculpt it so that it fits the user perfectly. He must then build a negative mold for this part and painstakingly paint the inside of this mold with layer after layer of latex until the proper thickness of the part he is creating has been achieved. This process takes large amounts of time which equates to large dollar amounts By way of example, if one were to contract the appearance created by the herein disclosed facial appliance with a professional makeup artist, it would cost one $200 to $300.

The facial appliance of the present invention and the process environment in which it is used was developed to reduce the professional process to the point of mass market appeal. Any one person with a limited amount of skill, and in some cases no skill at all, can come very close to achieving the exact results the professional makeup artist can achieve. The person does not have to have an artistic sculpting ability because the appliance is already sculpted and preformed. All the average person has to do, so to speak, is to paint by number, cut the part out, affix it to his own face using an adhesive, and apply a small amount of makeup and blend in the edges. The part does not cost $200 to $300. The relative cost is under $10 and this includes all the makeup necessary to do the job.

If the facial appliance pieces are affixed to the face properly, so that they contact all parts of the face, then anytime the person's face moves, the facial appliance piece will also move, thus becoming a second skin on the face which is the exact intention of professional makeup.

Given the properties of the material in that it will rot or mildew, is non-allergenic, will not deteriorate under the sun, and is extremely durable and pliable, the part is completely tailored for the mass market. It is completely safe to use.

The present invention also has professional applications. It is good enough to save the movie industry thousands upon thousands of dollars. The process is quick in application and it is so inexpensive the parts can be thrown away after use.

Objects of the invention are accordingly to accomplish the advantages set forth above.

Another object is to provide a method for making, and the resulting product of a facial appliance which can be mass produced at a relatively low price to provide an appearance substantially as realistic as that which can be produced by a professional makeup artist at a much higher price. The price of the present invention is so low that it can be thrown away in comparison to the cost of a professionally produced appliance of the same appearance.

A still further object of the present invention is to provide a facial appliance which is not only realistic in appearance but which is durable, pliable, non-allergenic and completely safe for human use.

Other objects and a fuller understanding of this invention may be had by referring to the following description and claims, taken in conjunction with the accompanying drawings, in which:

FIG. 8 is a perspective view showing the facial appliance produced in FIG. 7 placed over a hard plastic support part of the same configuration and produced by the same method as the facial appliance is produced.

Figure 7:
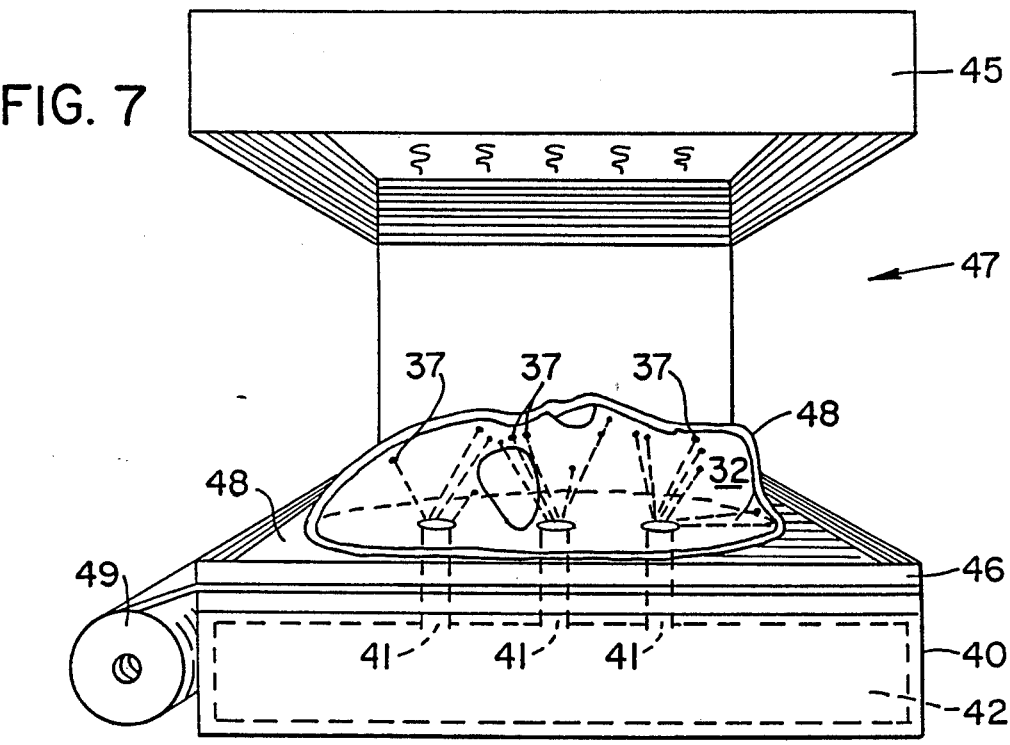
FIG. 7 is a view similar to FIG. 6 but showing the machine at the end of a vacuum forming cycle in producing a facial appliance of the present invention.
Figure 10A:
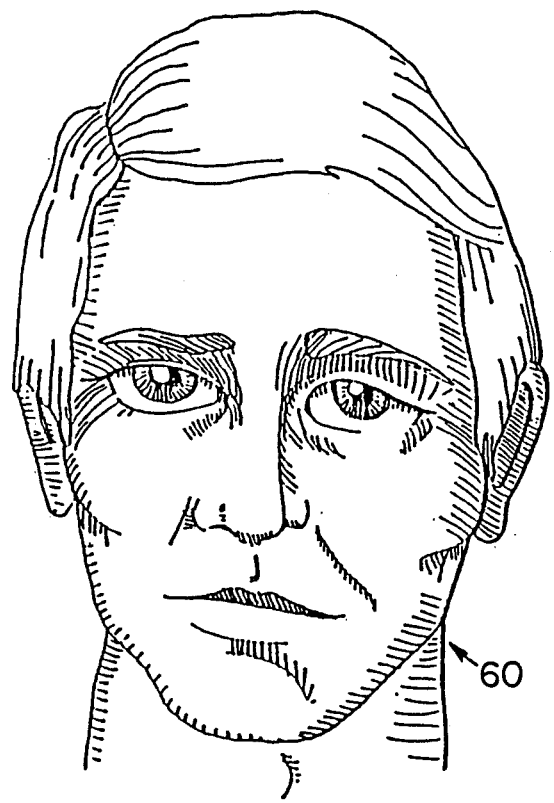
Figure 10B:
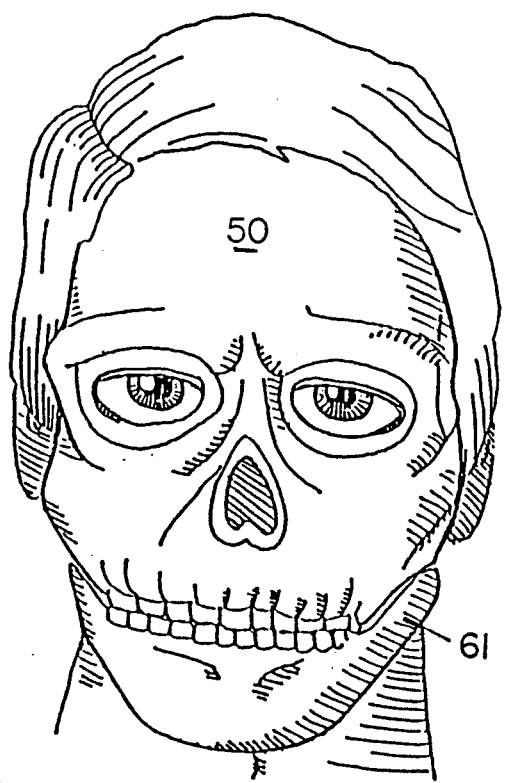
Figure 10C:
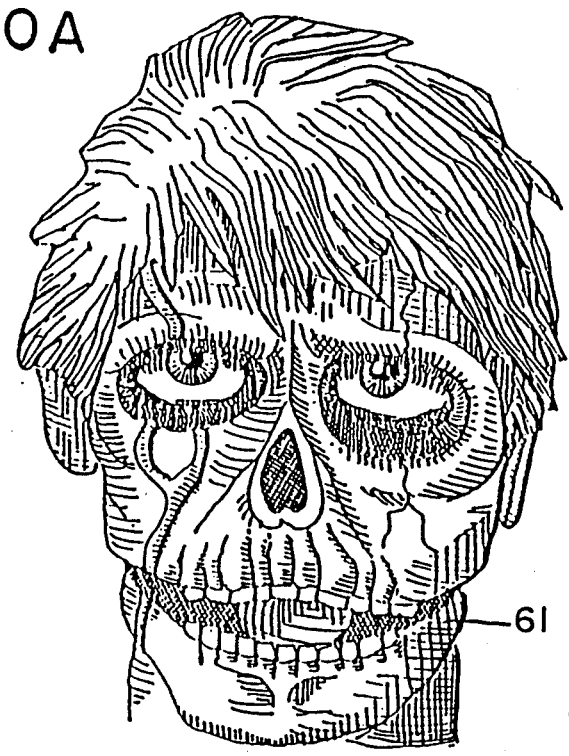
Figure 11:
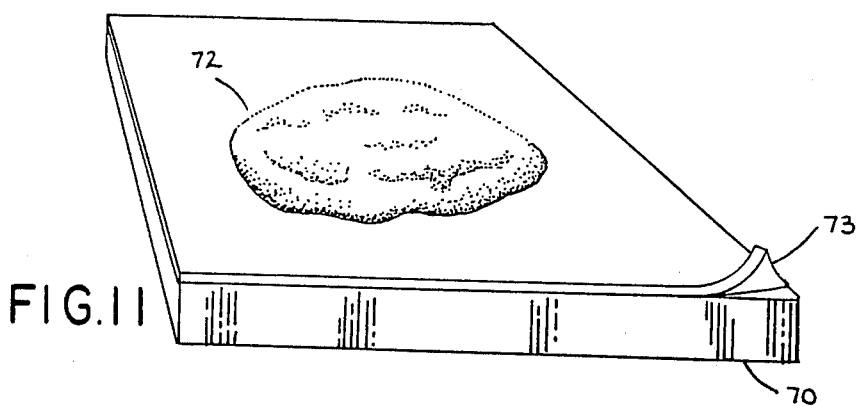
Figure 12:
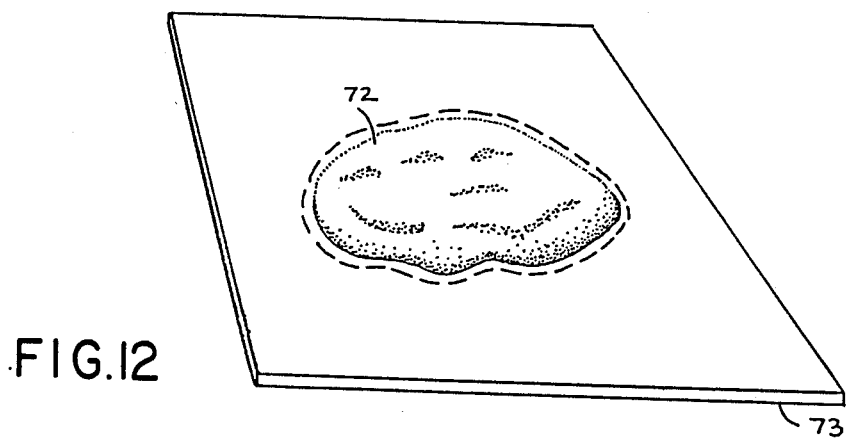
Figure 13:
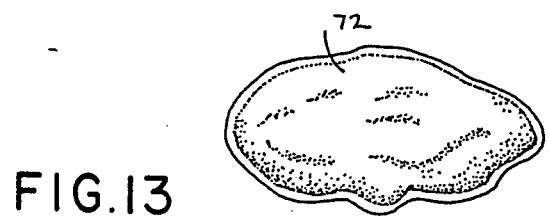
Figure 14:
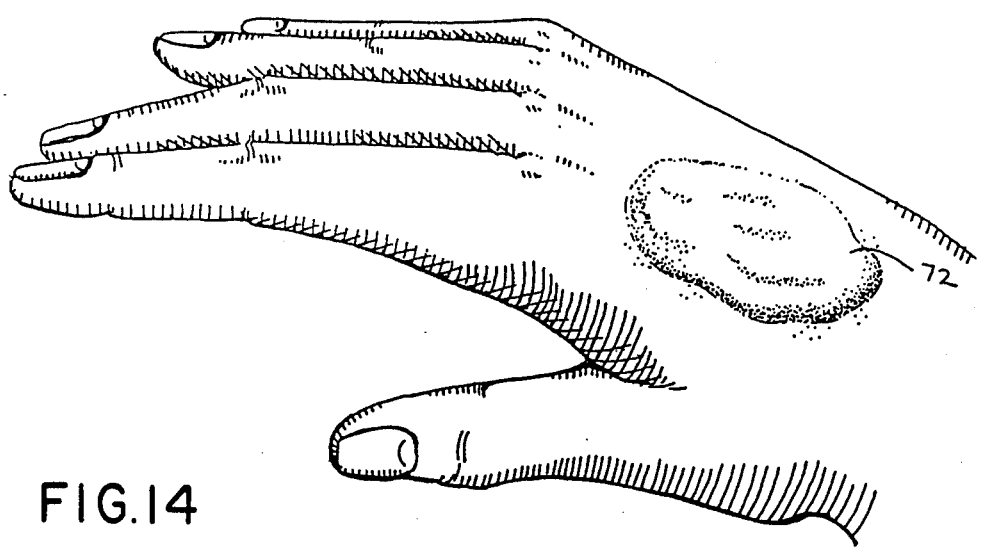

The support part carries and supports the appliance during transportation to the ultimate consumer and also provides support when painting or applying makeup to the facial appliance;

FIG. 9 illustrates frontal and side views of the facial appliance of the present invention with shaded areas illustrating portions to be cut away;

FIG. 10A is a frontal view of a human face to which the facial appliance of the present invention is to be applied;

FIG. 10B illustrates the facial appliance of FIG. 9 applied to the human face of FIG. 10A;

FIG. 10C is a view similar to FIG. 10B with makeup applied and with the human face in a slightly different position;

FIG. 11 is a view similar to FIGS. 7 and 8 but showing a special effects makeup product other than a facial appliance for application to other parts of the body;

FIG. 12 is a view showing the product of FIG. 11 removed from the mold used in the vacuum forming cycle used to produce it;

FIG. 13 is a view of the product of FIG. 12 with the "flash" or unwanted portion cut away; and FIG. 14 is a view showing the product of FIG. 13 applied to a human hand to create the special effect of a scar.

Figure 1:
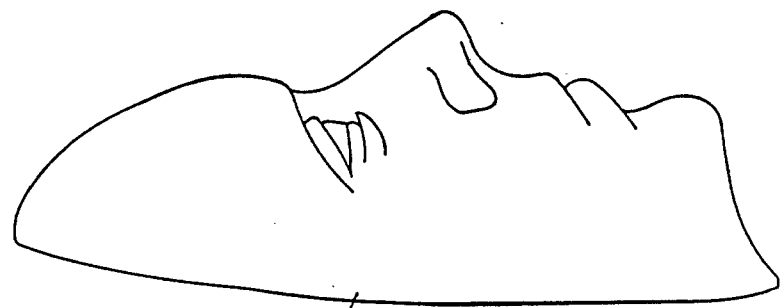
FIG. 1 is a perspective view of a base head used in sculpting the design of the facial appliance of the present invention.

The teachings of the present invention will be best understood by referring to the drawings which form a part of the present disclosure in conjunction with the following explanation. The first phase of the invention includes the method of making the facial appliance of the present invention. This is accomplished by providing a base head 20 as seen in FIG. 1 upon which the sculpting of the appearance of the facial appliance of the present invention is performed. The base head 20 is preferably constructed of plaster of paris although it can be constructed of substantially any non-porous substance. The size of the base head is important from the standpoint that it is of such a size as to statistically accommodate the average facial dimensions of approximately 80% of the entire population of the United States. The base head is laid flatwise upon a flat surface as indicated in FIG. 1 and the sculpting of the master face thereupon is commenced.

Figure 2:
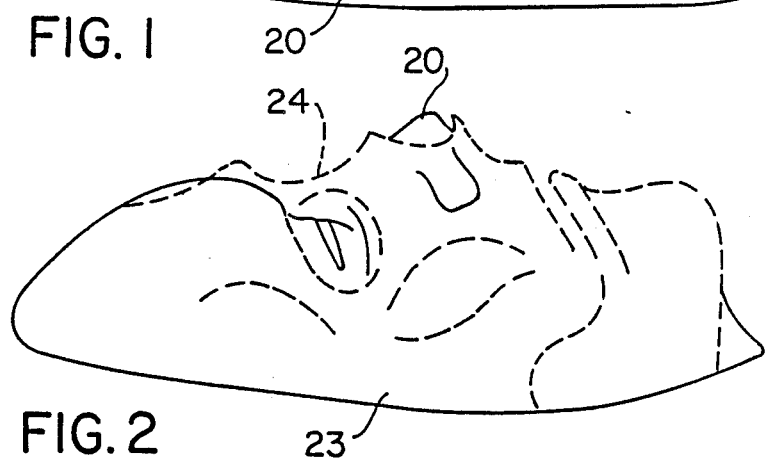
FIG. 2 is a perspective view of the base head to which has been sculpted a master face which is of the configuration of the facial appliance which is to be produced in accordance with the teachings of the present invention.

FIG. 2 indicates the master face mold 23 which is produced on the base head 20. This design is created by adding clay 24 or any non-porous building material directly to the base head 20. This design is accomplished by a relatively skilled artisan since the master face mold 23 must carefully and artistically describe the configuration of the facial appliance which is to be produced under the teachings of the present invention. The clay or other comparable building material is added and sculpting of the clay material continues until the artisan has completed the desired configuration for the final facial appliance which is to be produced. The final appearance is indicated in the drawings of FIGS. 2 and 3.

Figure 3:
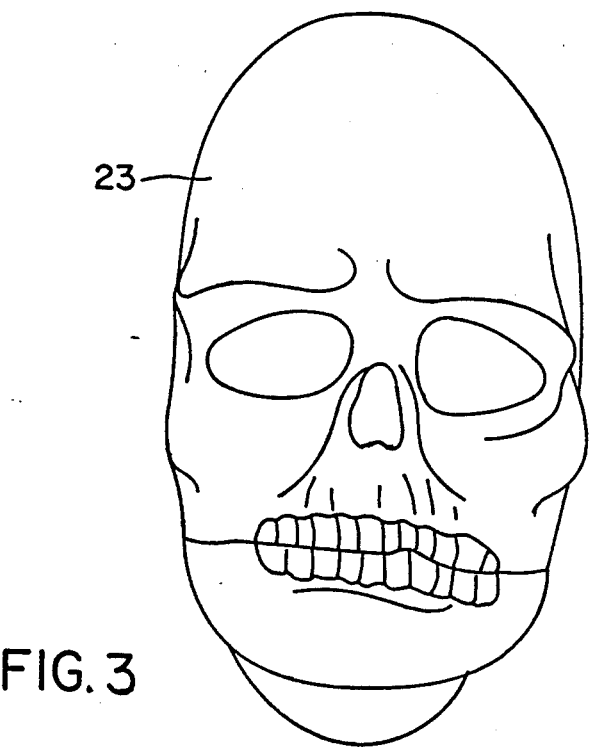
FIG. 3 is a frontal view of the master face of FIG. 2 which has been produced on the base head of FIG. 1.
Figure 4A:
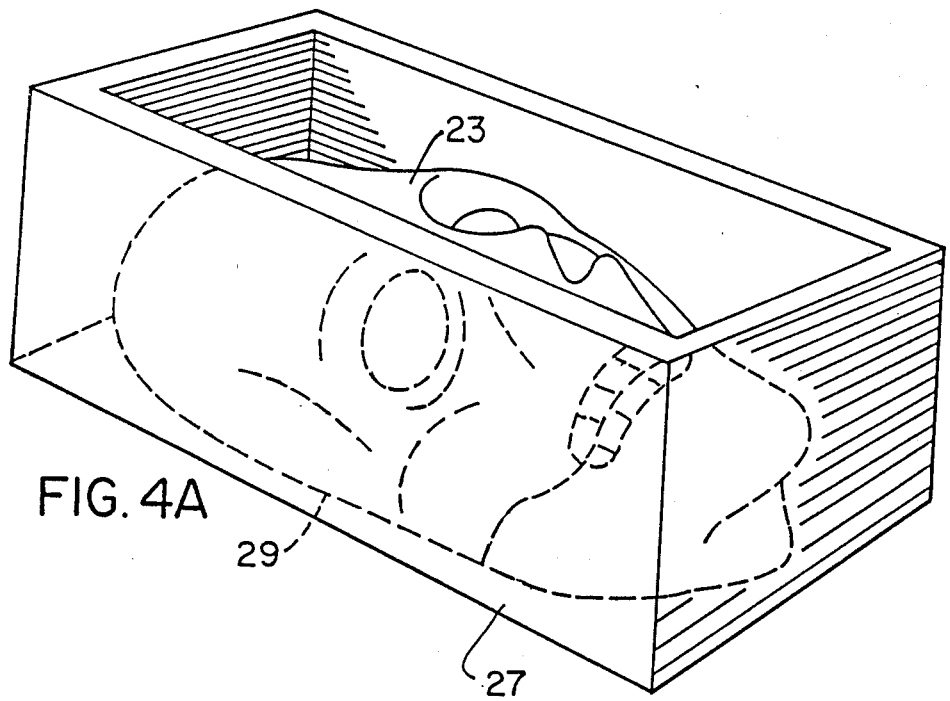
FIG. 4A is a perspective view showing the master face mold of FIGS. 2 and 3 placed in a container mold which is adapted to receive a moldable material thereabout to form a transfer mold.
Figure 4B:
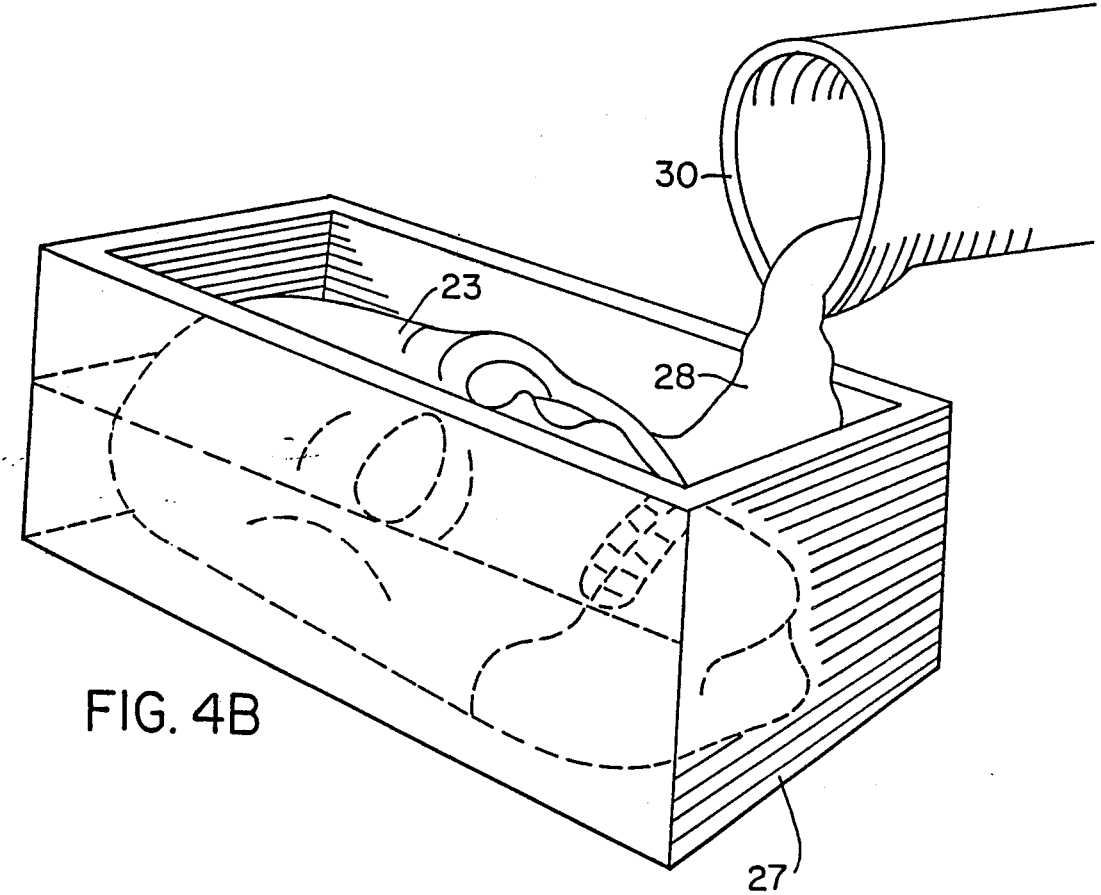
FIG. 4B is similar to FIG. 4A and showing moldable material being poured around the master face mold in the container mold to form the transfer mold.
Figure 4C:
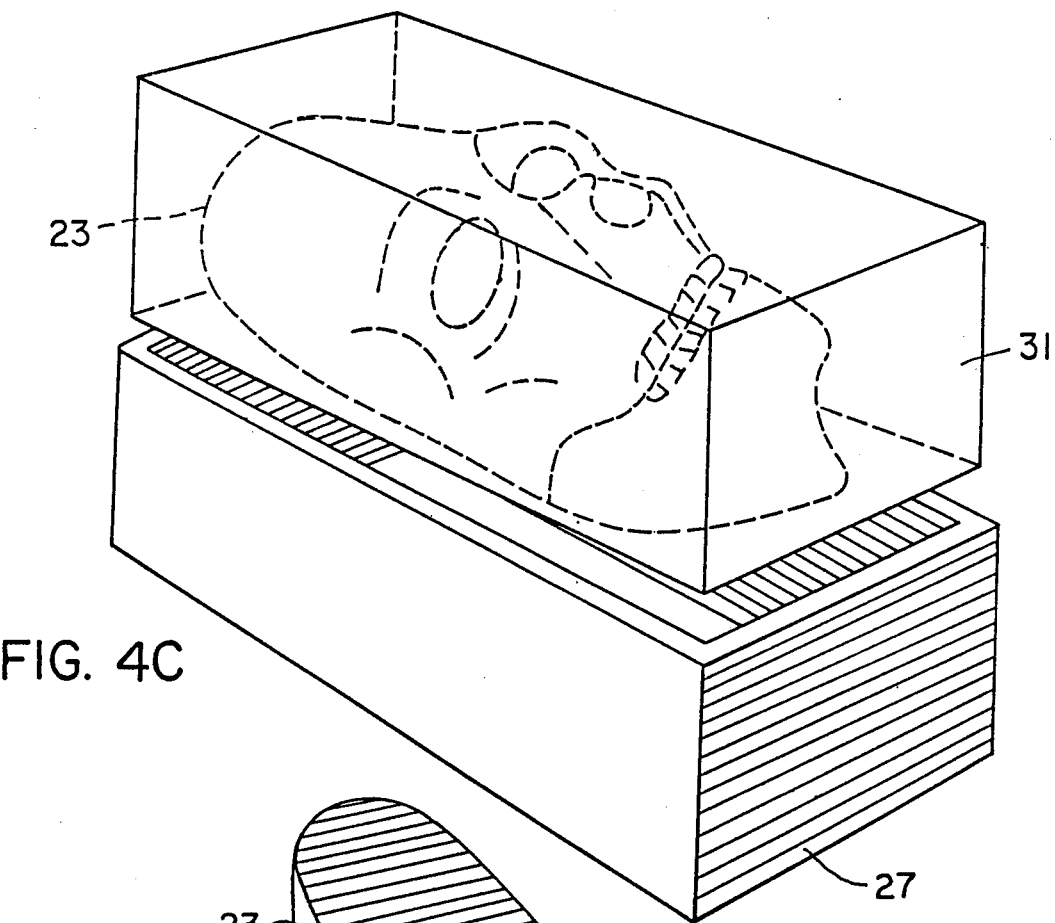
FIG. 4C is a perspective view showing the formed transfer mold being removed from the container mold.
Figure 4D:
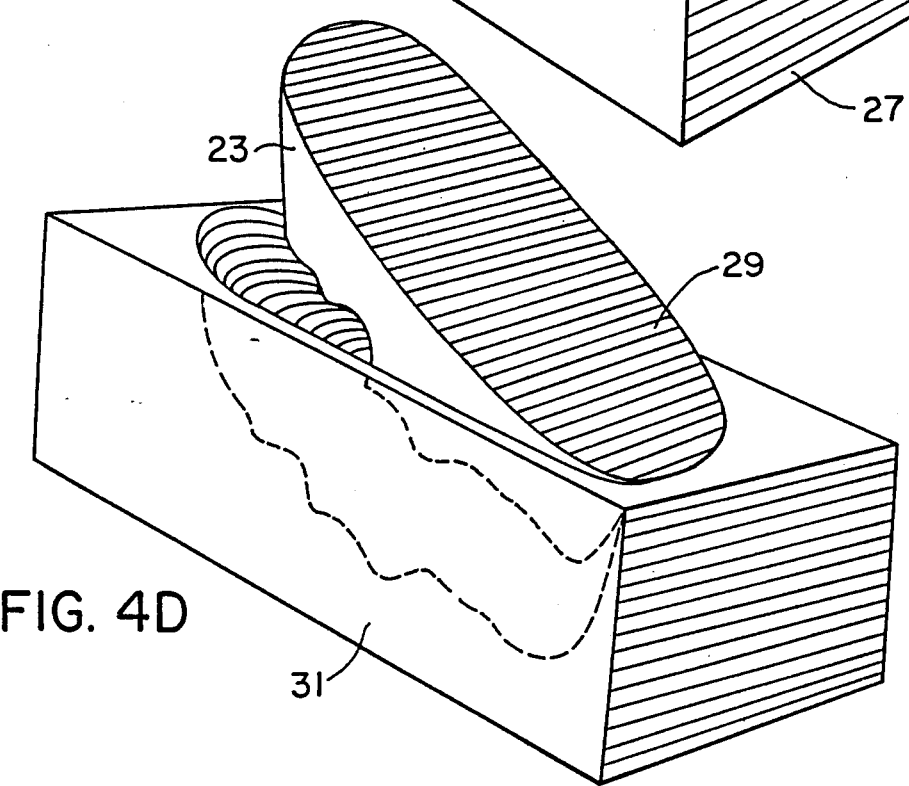
FIG. 4D is a perspective view showing the transfer mold turned over from its position of FIG. 4C (rotated 180 degrees) and illustrating the removal of the master face mold.
Figure 5A:
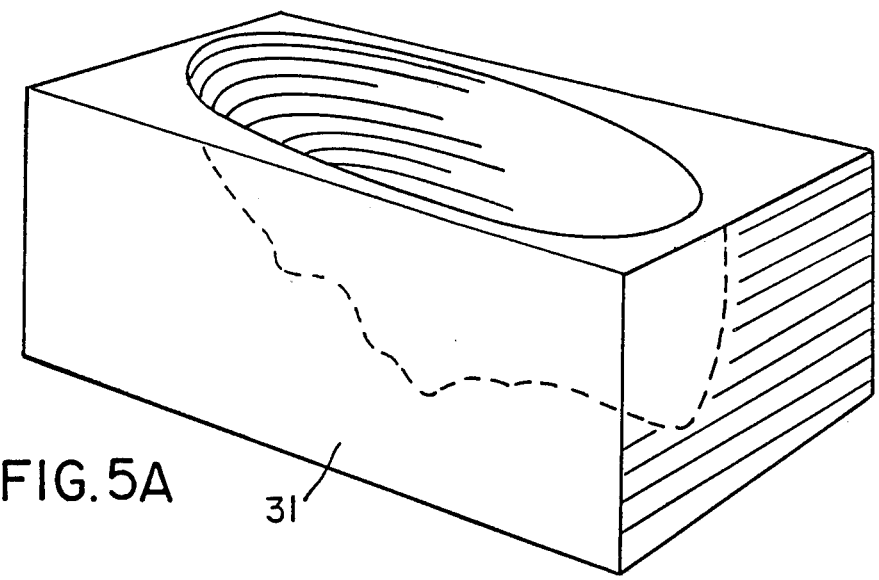
FIG. 5A is a perspective view of the completed transfer mold with the master face mold removed.

FIGS. 4A–4D illustrate the structure which is utilized to produce what is referred to herein as a transfer mold 31 which is a negative mold of the master face mold 23 (facial appearance) which is seen in FIGS. 2 and 3. To accomplish this end result, the master face mold 23 is placed in a container mold 27 which is comprised of vertical walls and a bottom wall which bottom wall may be simply a flat surface or which may be integrally connected to the vertically extending walls. A back flat surface 29 on the master face mold is placed upon the flat surface of the container mold 27 and a soft moldable material 28 is slowly poured into the container mold over the master face mold 23 from the container 30 as shown (FIG. 4B) Any soft moldable material will normally suffice for this purpose; however, for the purpose of suitably instructing those skilled in the art, is is preferred to use a two part urethane molding material for the end purpose. After the moldable material 28 has set up or cured sufficiently, the moldable material 28 is removed from the container mold 27 (FIG. 4C) and the master face mold 23 is removed from the moldable material (FIG. 4D) and the transfer mold 31 is completed (FIG. 5A). The inside surface of the soft and flexible transfer mold 31 is thoroughly cleaned usually with an alcohol and the transfer mold 31 is then ready for use.

Figure 5B:
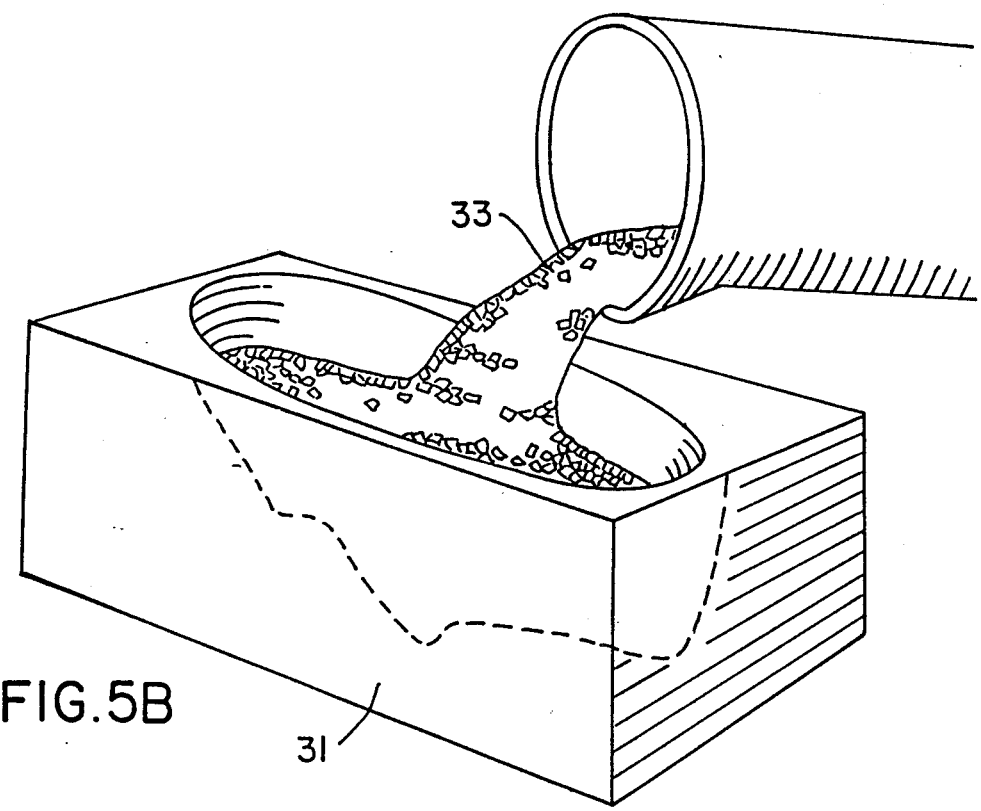
FIG. 5B is a view illustrating the pouring of hardenable material into the transfer mold to produce a hard vacuum forming mold.
Figure 5C:
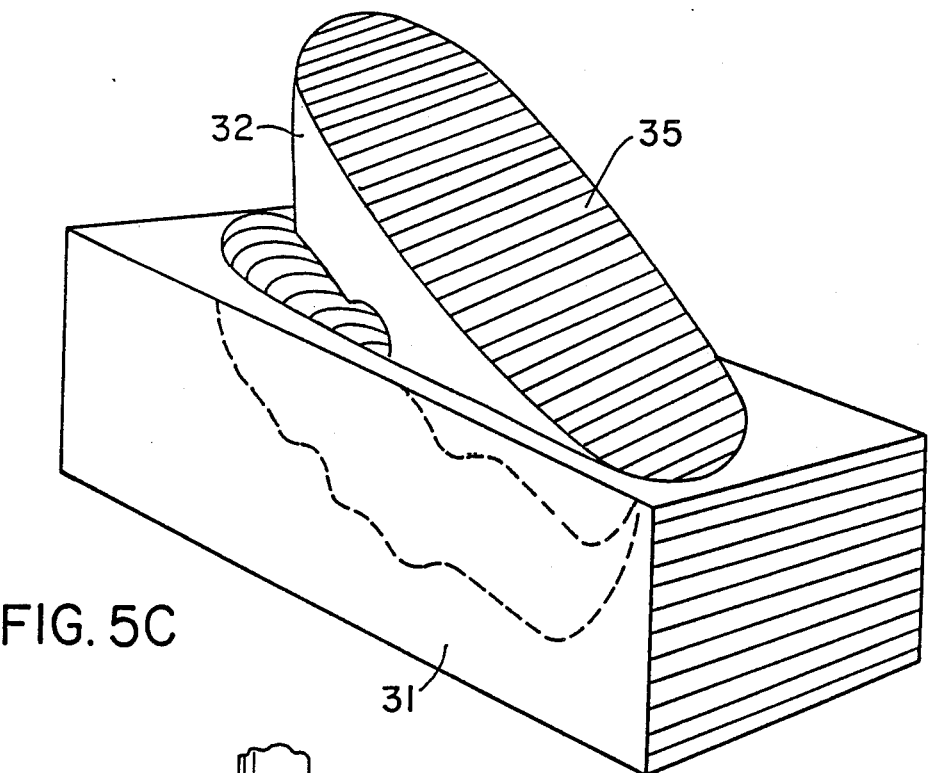
FIG. 5C is a view showing the vacuum forming mold being removed from the transfer mold.
Figure 5D:
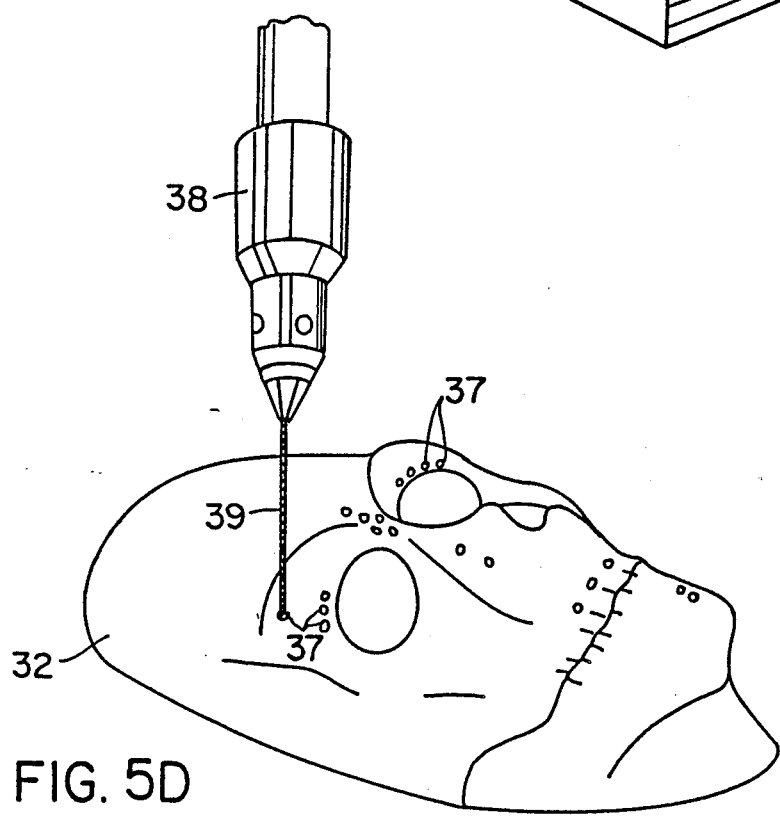
FIG. 5D illustrates the drilling of air vent holes in the vacuum forming mold which holes aid in the vacuum forming process.

FIG. 5A illustrates the transfer mold 31 in condition for its ultimate use which is to receive a hard moldable material 33 from which a vacuum forming mold 32 is constructed. The hard moldable material illustrated is a two part epoxy resinous molding material which has aluminum granules interspersed throughout. This material is slowly poured into the transfer mold (FIG. 5B) with the transfer mold 31 in the position shown. This results in a vacuum forming mold 32 (FIG. 5C) which is quite hard. The aluminum granules which are interspersed in the epoxy system assist in providing better heat transfer properties for the mold 32. As an alternative to forming the vacuum forming mold as just described, it is also possible to spray the facial configuration which is found in the transfer mold 31 with a molten metal thus creating a metal shell and the shell that is formed is then preferably filled with a two part epoxy material system with seeded aluminum interspersed therein. In either circumstance there is produced a very hard surfaced vacuum forming mold 32 which when removed from the transfer mold (FIG. 5C) after it is cured, can be used in the vacuum forming process which produces the facial appliance of the present invention.

After the vacuum forming mold 32 has been removed from the transfer mold 31, a workman carefully examines the surface of the same and manually removes all imperfections and the bottom surface 35 of the mold is ground flat so that it can be mounted in position in a vacuum forming machine. Air vent holes 37 are drilled in the mold 32 to assist in the vacuum forming process which will be described hereinafter. The drill is identified by numeral 38 and drill bit by numeral 39.

Figure 5E:
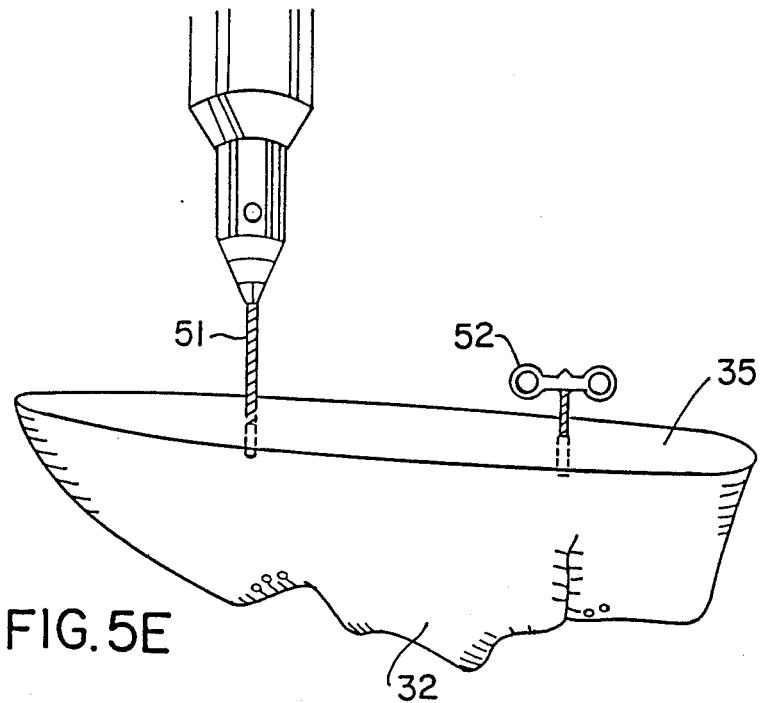
FIG. 5E illustrates drilling and tapping to produce two threaded openings in the back surface of the vacuum forming mold for the purpose of mounting the same to a base plate.
Figure 5F:
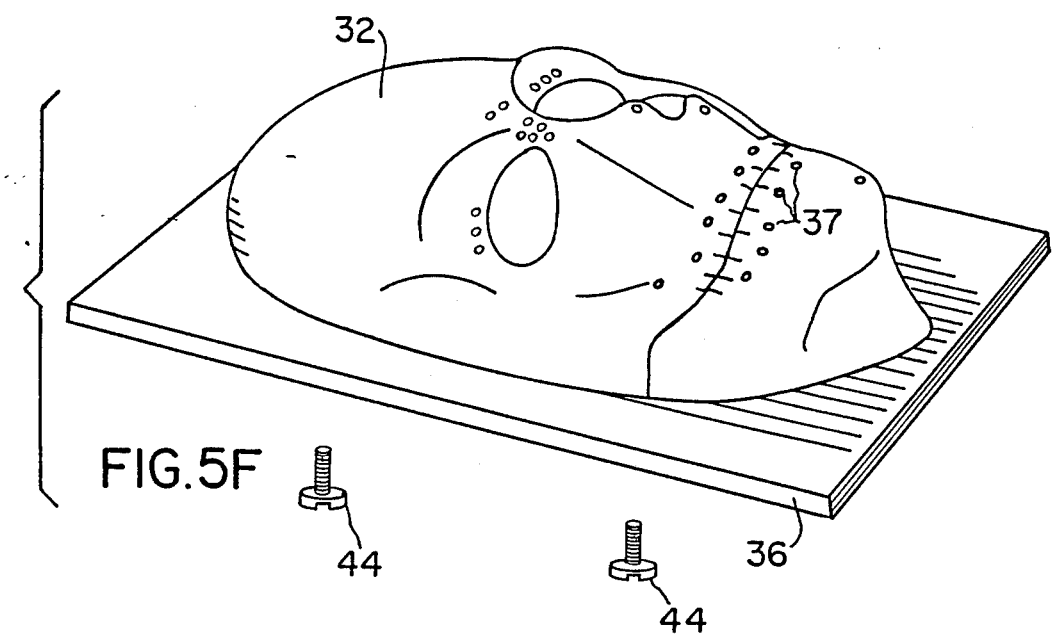
FIG. 5F shows the locating of the vacuum forming mold on a base plate to which it is attached by means of the threaded members which are shown which extend through openings in the base plate and into the threaded openings described in conjunction with FIG. 5E.

Vacuum forming mold 32 is next secured to a base plate 36 by two threaded members 44 (FIG. 5F) which extend through the base plate and into corresponding threaded openings in bottom surface 35. The threaded openings in surface 35 are made by drill bit 51 and tapping tool 52(FIG. 5E).

Figure 6:
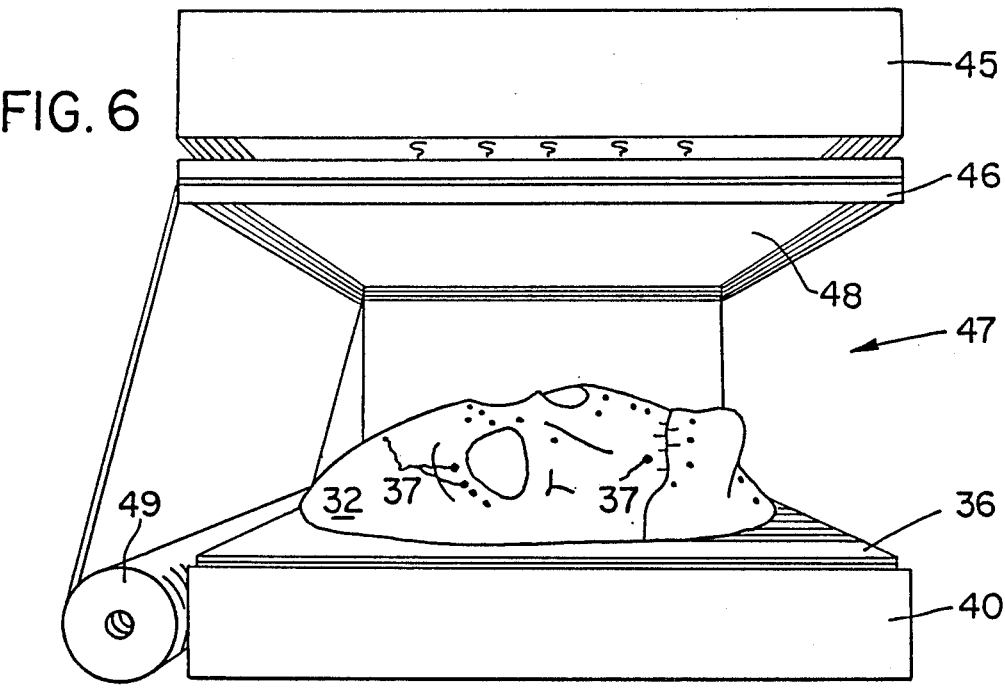
FIG. 6 is a perspective view showing the vacuum forming mold of FIG. 5F mounted on the platen of a vacuum forming machine and just prior to the starting of a vacuum forming cycle.

The vacuum forming mold 32 is next located with its base plate 36 on the platen 40 of a vacuum forming machine 47 (FIG. 6) which platen has a plurality of openings 41 (FIG. 7) extending to a space 42 which space in turn is connected to a vacuum source (not shown). It will be noted from FIG. 7 that the vent holes 37 are drilled in a direction so as to exit surface 35 at a location so as to coincide with one of the openings 41. The vacuum forming machine 47 also includes a heater or oven 45 as well as a vertically movable frame 46. The frame 46 is adapted to carry the precise and specific material from which the ultimate facial appliance is constructed in accordance with the teachings of the present invention. This material is identified by the reference numeral 48 and is a closed-cell, cross-linked, polyethylene foam which has a thickness in the range of 1/64 inch to ¼ inch and a density of between 1½ and 9 pounds per cubic foot. As illustrated in FIGS. 6 and 7, this material 48 is carried in the form of a roll 49.

This range of thicknesses and densities fall within the ranges necessary to produce a successful facial appliance in accordance with the teachings of the present invention. If the facial appliance being produced requires a great deal of mobility and movement, then the sheet material must be as thin as possible and likewise, if the facial appliance requires no mobility and is to be placed on a rigid spot on the face, then the chosen material may be toward the thicker end of the range given. For the purposes of the facial appliance that is being produced as illustrate in the drawings, the actual mold is 3½ inches deep and the amount of mobility required is great. Under these circumstances it is desirable that the entire facial appliance be as completely flexible as possible and move with every expression of the face to which it is to be attached and under these circumstances it is suggested and desired that the thickness of the foamed, crosslinked, polyethylene material be 1/32 of an inch thick and have a density of 6 pounds per cubic foot.

With the materials and the various components of the vacuum forming maching in the position shown in FIG. 6, the heater 45 is pulled horizontally outwardly into position over the sheet 48 of foamed polyethylene material in order to soften the polyethylene material. The amount of heat applied both in point of time and degrees Fahrenheit is also a function of the thickness and density of the polyethylene material as well as the depth of the vacuum forming mold over which the polyethylene material is drawn. By way of example, a sheet of polyethylene of 1/32 inch thickness and having a density of 6 pounds per cubic foot which is to be drawn over a vacuum forming mold that is 3½ inches deep with a great deal of detail, will require the application of about 400° F. of heat for about 5 seconds before it is drawn over the vacuum forming mold and the heat is removed. After the sheet of polyethylene material is heated, the sheet is moved downwardly by means of the frame 46 in which it is carried, the heater 45 is pushed horizontally back away from the sheet of polyethylene and a vacuum is applied by means of a vacuum source. This (via space 42, openings 41 and vent holes 37) causes air pressure to be removed from between the surface of the vacuum forming mold and the sheet of polyethylene material causing the sheet to closel conform to the configuration of the surface of mold 32. The vacuum is maintained until the sheet has cooled and the shape of the surface of the mold 32 has been firmly established to the sheet 48 of polyethylene material. The thus formed sheet of polyethylene material retains its new shape and is removed from the vacuum forming mold.

The sheet material 48 which is specifically adapted to the teachings of the present invention is a closed-cell, crosslinked, polyethylene foam. The closed-cell structure can be controlled closely enough to produce a smooth sheet and the cells of the closed-cell construction are on the order of 0.1 to 0.3 millimeters in diameter. The cross-linking of the polyethylene structure can be accomplished by irradiation cross-linking or chemical cross-linking. The irradiation cross-linking is normally utilized to produce the sheet thicknesses that are required in the present invention. The polyethylene foams utilizable in the present invention may be produced from modified polyethylenes or from blends and co-polymers such as ionomers. The following table illustrates the typical properties preferred in the polyehtylene sheet material utilized in the present invention.

TABLE I

| | Units | | Density, Pounds Per Cubic Foot | | |
|---|---|---|---|---|---|
| | | | 2 | 4 | 6 |
| Compression- | psi | at 25% defl. | 4 | 6 | 8 |
| Deflection | | at 50% defl. | 11 | 16 | 19 |
| ASTM D-1056 | | at 75% defl. | 36 | 50 | 67 |
| Compression Set ASTM D-1056 22 hr. comp. at 50% defl.; 24 hr. recovery | | % of original thickness | 23 | 15 | 13 |
| Tensile Strength | psi | M | 55 | 120 | 190 |
| ASTM D-1564 | | C | 40 | 90 | 140 |
| Ultimate Elongation | % | M | 400 | 450 | 580 |
| ASTM D-1564 | | C | 400 | 430 | 500 |
| Tear Resistance | lb./in. | M | 11 | 21 | 30 |
| ASTM D-624 Die C | | C | 9 | 18 | 27 |
| Shore Hardness ASTM D-2240 | | | | | |
| AA Scale | | | 4 | 10 | 20 |
| 00 Scale | | | 45 | 55 | 65 |
| Thermal Stability 3 hr, no load | | % shrinkage at 180° F. | 4.0 | 3.0 | 2.4 |
| | | at 215° F. | 20.0 | 15.0 | 9.9 |
| Low Temperature Brittle point 180° Flex, ⅛"mandrel | °F. | | −110, all densities | | |
| Water Absorption ASTM D-1667 | | lb./sq. ft. of cut surface maximum | 0.04 | 0.04 | 0.04 |

M: Machine Direction
C: Cross-Machine Direction

The next step in the invention is the production of what has been referred to as a support appliance 55 (FIG. 8). This member 55 is simply a support or form to hold the soft pliable facial appliance 50 (FIG. 8) which has been produced (FIG. 7) for the purpose of transporting it to the ultimate consumer and also for supporting the facial appliance 50 when the ultimate consumer is completing the facial appliance appearance. The support appliance is produced on the vacuum forming mold 32 in the same manner as the production of the facial appliance 50. The support appliance 55 is formed of a thermoplastic material which is vacuum formable under heat and pressure and when cooled takes on a hard relatively rigid form. This material may, for example, be a hard polyvinylchloride or styrene. FIG. 8 illustrates the facial appliance 50 as carried by and supported by the support appliance 55. The support appliance is necessary because the facial appliance 50 is not self supportable so that various work may be performed thereon.

The next steps involved in the teachings of the present invention are the preparation of the facial appliance 50 for its ultimate use. With the facial appliance 50 in position on the support appliance 55 as illustrated in FIG. 8, the ultimate user is then prepared to complete the appearance of the facial appliance. Cutting diagrams are normally supplied to the ultimate user by the manufacturer of the facial appliance and certain areas of the facial appliance should be cut out and removed. In the facial appliance as shown in FIG. 9, the shaded areas are normally removed by cutting those portions away from the portion of the facial appliance which is to be ultimately used. In the particular instance illustrated in FIG. 9, the jaw portion of the facial appliance is also severed from the upper face portion of the facial appliance along the dotted line 58. In many facial appliances, the part may be cut into more than two parts and others may not be cut at all. The facial appliance is painted and otherwise made up and one completing the appearance of the facial appliance would normally accomplish the final appearance by either following a photograph or drawing or if enough imagination is available, one could complete the design without other assistance.

After the facial appliance has been completed, the user is ready to fit the pieces to his face and to the degree that the various portions do not completely fit the user's face, they can be trimmed away until they are comfortable and do fit. The pieces of the facial appliance are adhered to the user's face by an adhesive applied to the back of the face pieces. FIG. 10A illustrates a human face 60 and FIG. 10B shows the facial appliance 50 adhered to face 60. The jaw portion 61 is separate from the upper portion of appliance 50.

The edges of the facial appliance are blended into the areas of the user's face by use of the same makeup and colors which have been utilized to paint the front portions of the facial appliances. Other makeup can be utilized to complete the appearance FIG. 10C illustrates the completed makeup and illustrates the jaw portion 61 movement independent from the upper portion of the appliance 50.

When the pieces of the facial appliance have been worn and it is desired to remove them and store them for reuse, all that one need do is carefully peel the pieces off of one's face and clean the adhesive off of the back with makeup remover and replace them on the support appliance 55 where they will be held in their desired shape until one is ready to utilize the facial appliance again.

It will therefore be seen that in accordance with the teachings of the present invention a facial appliance has been produced which provides the advantages set forth in the foregoing specification and which can be produced at an extremely small percentage of the total cost of professionally made facial appliances. The facial appliance of the present invention is extremely durable, pliable and flexible as well as being nonallergenic and is totally safe for use by the consuming public.

It will be appreciated by those skilled in the art that the facial appliance of the invention might be formed by use of a female mold rather than the male mold 32 illustrated herein. Such a female mold would be like transfer mold 31 (FIG. 5C) in shape but constructed of sufficiently hard material to accomplish the end result. It will also be appreciated by those skilled in the art that grid and plug assists may be used in the vacuum forming process as well as pressure assists.

FIGS. 11 through 14 illustrate a variation of the invention specifically described in conjunction with FIGS. 1-10. These figures illustrate the manufacture of a special effects makeup product in a manner practically identical with the manufacture of the facial appliance described in connection with FIGS. 1-10.

A mold 70 is produced in a manner identical to the production of mold 32 differing only in that it is formed to produce the special effect of a scar 72 rather than a facial appliance. The product and mold as seen in FIG. 11 is used in a manner as previously described in connection with FIGS. 6 and 7 and from the material specifically described hereinabove. The product of the scar 72 with attached "flash" 73 is seen in FIG. 12 and FIG. 13 and illustrates the scar 72 with the "flash" removed as by cutting with scissors. The scar may be painted or otherwise treated and is then applied to a person's body as illustrated in FIG. 14. The edges of the scar 72 are blended into the area of the user's body by makeup material to perform the makeup function.

Although this invention has been described in its preferred form and preferred practice with a certain degree of particularity, it is understood that the present disclosure of the preferred form and preferred practice has been mad only by way of example and that numerous changes in the details of construction and the combination and arrangement of parts and steps may be resorted to without departing from the spirit and the scope of the invention as hereinafter claimed.

What is claimed is:

1. A face prosthesis including in combination a sheet of synthetic resinous material formed into a shell and of a shape to closely conform to the face of a human, said synthetic resinous material of said sheet consisting essentially of a closed-cell, cross-linked polyethylene foam and being of a thickness of between 1/64 inch and ¼ inch and having a density of 1½ and 9 pounds per cubic foot.

2. A body prosthesis including in combination a sheet of synthetic resinous material formed into a shape to closely conform to the prosthesis desired, said synthetic resinous material of said sheet consisting essentially of a closed-cell, cross-linked polyethylene foam and being of a thickness of between 1/64 inch and ¼ inch and having a density of 1½ and 9 pounds per cubic foot.

* * * * *